United States Patent [19]
Hussmann et al.

[11] 3,825,236
[45] July 23, 1974

[54] MACHINE FOR THE PREPARATION AND EXTRUSION OF PLASTICS

[75] Inventors: Jurgen Hussmann, Gelsenkirchen; Dieter Kurth, Bochum, both of Germany

[73] Assignee: Gebr. Eickhoff Maschinenfabrik und Eisengiesserei m.b.H., Bochum, Germany

[22] Filed: Nov. 20, 1972

[21] Appl. No.: 307,803

[30] Foreign Application Priority Data
Nov. 24, 1971 Germany............................ 2158246

[52] U.S. Cl. ............................................. 259/191
[51] Int. Cl. ............................................. B29b 1/10
[58] Field of Search ........ 259/191, 192, 193, 6, 21, 259/41, 104, 9, 10; 425/204, 202, 208, 209

[56] References Cited
UNITED STATES PATENTS

| 2,581,451 | 1/1952 | Sennet | 259/6 |
| 2,754,542 | 7/1956 | Henning et al. | 425/202 X |
| 2,770,837 | 11/1956 | Reifenhausen | 259/191 X |
| 2,785,438 | 3/1957 | Willert | 259/193 |
| 2,802,238 | 8/1957 | Colombo | 259/192 |
| 3,008,184 | 11/1961 | Fritsch | 425/204 |

Primary Examiner—Harvey C. Hornsby
Assistant Examiner—Philip R. Coe
Attorney, Agent, or Firm—McGlew and Tuttle

[57] ABSTRACT

The machine includes a planetary roll extruder, a single-screw feeding device in advance of the extruder and a single-screw extrusion press following the extrusion. The feeding device includes a cylinder and a feed hopper, and the feeding device, the extruder and the extrusion press are combined by having a common shaft extending therethrough. The common shaft, in the range of the feeding device and of the extrusion press, is designed as a screw shaft and, in the range of the planetary roll extruder, is designed as a central or "sun" shaft. The feeding device is constructed as a feed press, and at least one of the planetary spindles of the extruder is axially fore-shortened relative to the other planetary spindles to form a revolving receiving chamber for the material supplied by the feed press. The feed press is constructed to have a feed performance exceeding the receiving capacity of the planetary roll extruder and thus of the single-screw extrusion press. Preferably every other planetary spindle of the extruder is axially fore-shortened to form a receiving chamber.

10 Claims, 3 Drawing Figures

MACHINE FOR THE PREPARATION AND EXTRUSION OF PLASTICS

FIELD AND BACKGROUND OF THE INVENTION

This invention relates to machine for the preparation and extrusion of plastics, comprising a planetary roll extruder, with a central or "sun" shaft and planetary spindles, a single-screw feed hopper device in advance of the extruder and a single-screw extrusion press following the extruder, where the feeding device has a feed hopper and where the feeding device, the extruder, and the extrusion press are combined by having a common shaft extending therethrough and designed, in the range of the feeding device and of the extrusion press, as a screw shaft and, in the range of the extruder, as a central shaft.

Within the context of the present invention, the term "planetary roll extruder" means an extrusion press wherein planetary spindles, a central shaft and a surrounding cylinder are geared with each other on the interior of the cylinder, by means of a helical gearing which effects the feed of the material to be plasticized, homogenized or both, in the planetary roll extruder. The term "homogenization" is intended to include also dispersion. Also within the context of the invention, the term "plastic" is intended to designate both so-called thermoplastic materials, which is plasticized and extruded, and duroplastic materials, for example, epoxy resins, which are charged together with a hardener, and which are prepared as well as extruded in the machine.

Machines of the general type are known and, in known machines, the planetary roll extruder determines the feed performance and thus the total output. The single-screw feeding device feeds the material to be prepared to the planetary roll extruder practically pressure-free, and contributes nothing to the output of the machine. The screw shaft is only an aerating element in the range of the single-screw feeding device. Thus, the output of known machines is limited. Even though the output can be influenced by varying the speed of rotation of the common shaft, and thus the working speed of the planetary roll extruder, there are limits to this measure, due to the generation of heat which impairs the quality of the prepared plastics.

SUMMARY OF THE INVENTION

This invention is directed to the problem of improving the output of a machine of the above described type without impairing the quality of the prepared and extruded plastics.

This for purpose, the invention is directed to a machine for preparing and extruding plastics, comprising a a planetary roll extruder with a central shaft and planetary spindles. A single-screw feeding device is arranged ahead of the extruder and a single-screw extrusion press follows the extruder, the feeding device having a feed hopper and the feeding device, the extruder and the extrusion press being combined by having a common shaft extending through all three. This shaft is designed, in the range of the single screw-feeding device and of the single-screw press, as a screw or threaded shaft, and in the range of the planetary roll extruder, as the central shaft. In accordance with the invention, the single-screw feeding device is designed and constructed as a feed press, that is, as a true feeding single-screw press, and at least one of the planetary spindles of the planetary roll extruder is axially foreshortened to form a revolving receiving chamber for the material supplied by the single-screw feeding press.

In accordance with a preferred embodiment of the invention, the single-screw feed press is designed and constructed for a feed performance which exceeds the receiving capacity of the planetary roll extruder and thus that of the single-screw extrusion press. The feed characteristic of the single-screw feed press should generally be independent of the back pressure. With such a design, the plasticizing, homogenizing, or plasticizing and homogenizing effect of the planetary roll extruder is utilized optimally without any reduction in quality of the prepared and extruded plastics, irrespective of the starting materials.

Within the framework of the above described basic concept, there are many possibilities of further developing the two parts comprising, on the one hand, the single-screw feeding device designed as a single-screw press, or feed press, and, on the other hand, the planetary roll extruder.

With respect to the design of the feed press, in accordance with the invention the screw shaft thereof has a length of at least 2D, and preferably 3D, where D is the overall or external diameter of the screw shaft. Within these limits, the feed press can be designed as a true extrusion press or, so to speak, as a screw extruder, with pressure buildup. This is due to the fact that the feed press has a cylinder in which the screw shaft is mounted with very little play, namely merely the necessary play for rotation of the screw. The screw shaft of the feed press itself, generally is cut with a tapering core, while the cylinder of the feed press can have outgoing longitudinal grooves which extend at an angle of 0° to 45° to the screw axis. The volume of these grooves should be so dimensioned that it is about 5 to 10 percent of the screw thread volume, related to a single turn of the thread of the screw. The combination of the above described measures results in an optimization with respect to the supply of the planetary roll extruder with material already prepared and, if necessary, also plasticized, homogenized, or both in the feed press. This may require additional heating of the cylinder of the feed press. In particular, if this additional heating is provided, it makes readily possible the feeding of even PVC chips and the like to the feed press through the feed hopper.

In order to optimize the planetary roll extruder of the machine embodying the invention, in accordance with the invention, every second planetary spindle of the planetary extruder is axially foreshortened in the above described manner to form a respective receiving chamber for the material made available by the single-screw feed press. A foreshortening of these planetary spindles by a value equal to the spindle core diameter $d$, or about $d/2$, is generally sufficient and at the same time optimal. The length of the planetary roll extruder depends on the desired plasticization, homogenization, or plasticization and homogenization effect, the cooling and heating of the associated cylinder or of the central shaft being effected selectively, as known to those skilled in the art.

The invention is based on the fact that the output of a machine of the type embodied in the invention can be improved considerably without impairing the quality of the prepared and extruded plastics, if one or several receiving chambers are formed, in the above described manner, in the planetary extruder, and if the material prepared in the feed press is, so to speak, forced into these receiving chambers. Suprisingly, the self-cleaning of the entire machine and of the planetary extruder, which is absolutely necessary, is in no way impaired. While in known machines, the entrance feed and the continued feed had to be taken over by the planetary extruder at the expense of the feed constancy and of the pressure potential, because of the pressure-free supply of the prepared plastics to the planetary extruder, the plasticizing, homogenizing, or plasticizing and homogenizing effect of the planetary extruder is fully utilized in the invention, as the extruder is always supplied, through the receiving chambers, with the amount of prepared material that is necessary for an optimum output. Even with a very high output, no reduction in the quality of the prepared and extruded plastics is observed, and in particular no hardening signs are observed in the processing of duroplastic synthetic resins, for example, epoxy resins, with highly active hardeners, due to an undesired temperature increase.

An object of the invention is to provide an improved machine for the preparation and extrusion of plastics.

Another object of the invention is to provide such an improved machine having an increased output without any impairing of the quality of the prepared and extruded plastics.

A further object of the invention is to provide such a machine in which a planetary extruder is utilized optimally without any reduction in quality of the prepared and extruded plastics, regardless of the starting materials.

An understanding of the principles of the invention, reference is made to the following description of a typical embodiment thereof as illustrated in the accompanying drawing.

DESCRIPTION OF THE PREFERRED EMBODIMENTS

Figure 1:
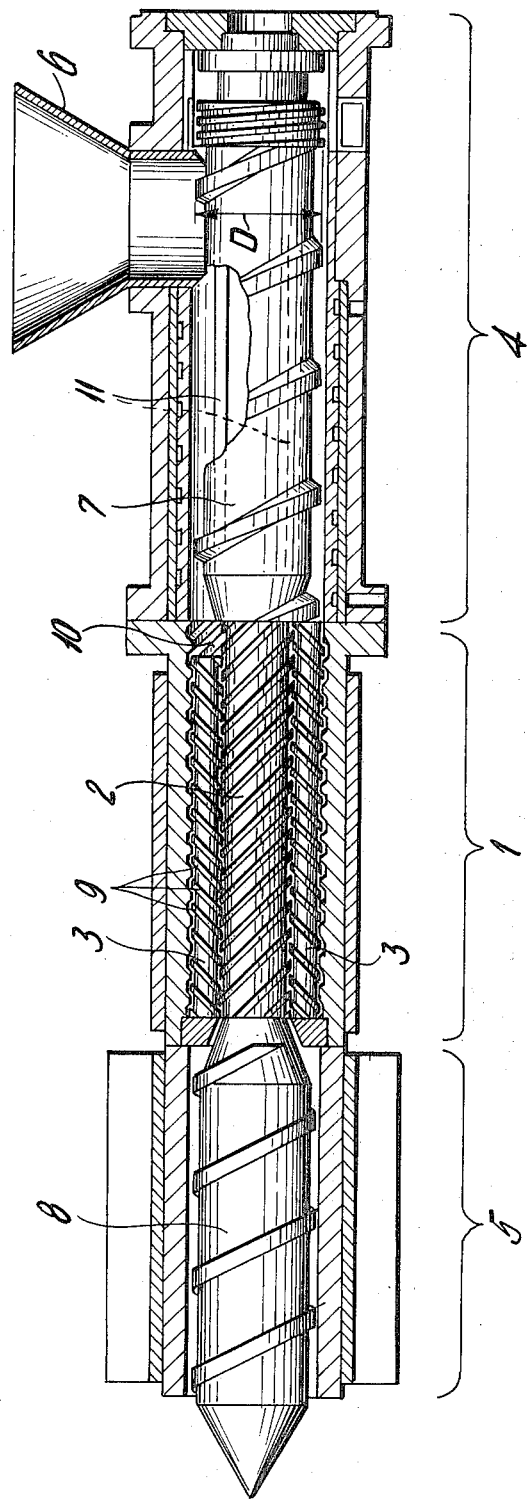
FIG. 1 is an axial sectional view through a machine embodying the invention.

The machine illustrated in the drawings serves to prepare and extrude plastics. In this basic design, it comprises a planetary extruder 1 with a central shaft 2 and planetary spindles 3, a single-screw feeding device 4 being arranged in advance of extruder 1 and a single-screw extrusion press 5 following extruder 1. Feeding device 4 has a feed hopper 6 and otherwise feeding device 4, extruder 1 and extrusion press 5 are combined, so to speak, by a continuous common shaft 2, 7, 8 extending therethrough. This shaft is designed, in the range of feeding device 4 and in the range of extrusion press 5 as a screw of threaded shaft 7,8, respectively, and in the range of planetary roll extruder 1 as the above-mentioned central shaft 2, Central shaft 2, planetary spindles 3 and the inner wall of the cylinder of extruder 1 are geared with each other by means of helical gearing 9. With this arrangement, a feeding effect is attained in planetary extruder 1, in addition to the plasticizing and homogenizing effect.

Figure 2:
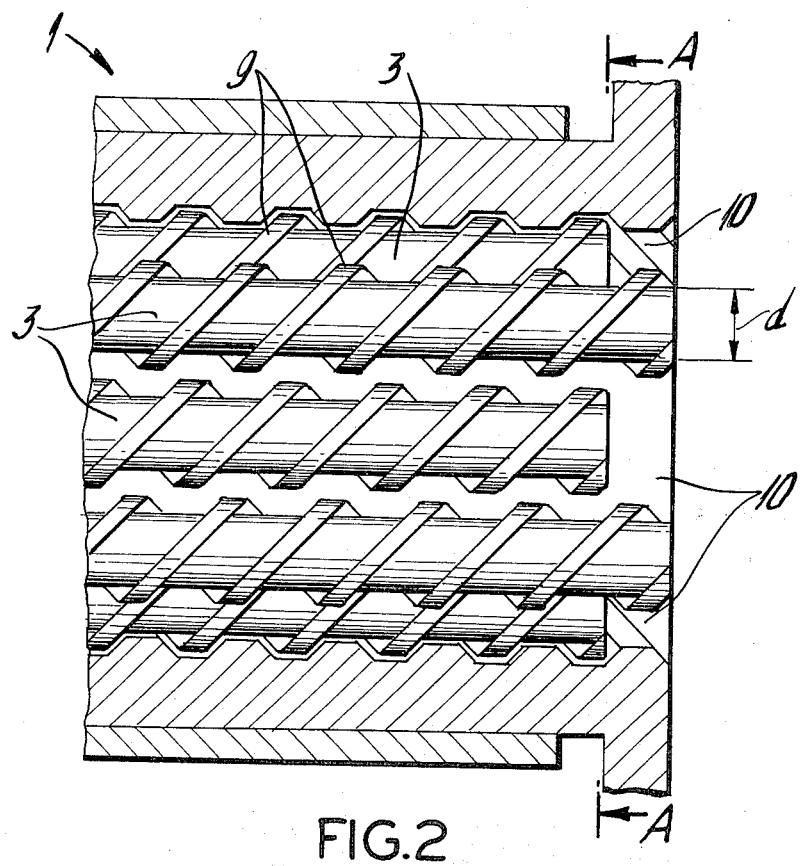
FIG. 2 is an axial sectional view, to a substantially enlarged scale as compared to that of FIG. 1, of a portion of the extruder of FIG. 1 and its planetary spindles.
Figure 3:
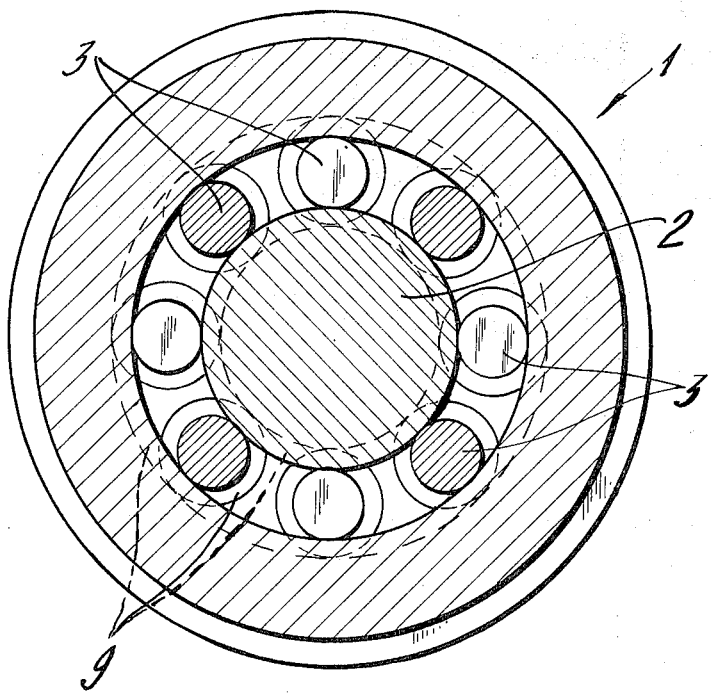
FIG. 3 is a diametric sectional view taken on the line A—A of FIG. 2.

As can be seen from FIG. 1, single-screw feeding device 4 is designed and constructed as a feed press or, so to speak, as an extruder or extrusion press. In addition, it can be seen in FIG. 1, and more particularly in FIGS. 2 and 3, that every second planetary spindle 3 of extruder 1 is axially foreshortened to form a revolving receiving chamber 10 for the material supplied by feed press 4.

As mentioned, feed press 4 is a true extruder. To this end, press 4 has a screw shaft 7 which, in the illustrated embodiment, has a length of about 3D where D denotes the overall exterior diameter of the screw shaft 7. In addition, screw shaft 7 of feed press 4 is cut with a tapering core, but otherwise is a flat-cut rectangular cross-section thread screw. The feed performance of press 4 is so selected that it exceeds the receiving capacity of planetary roll extruder 1 and thus that of single-screw extrusion press 5. Planetary extruder 1 thus can always receive material to be plasticized or homogenized optimally through receiving chambers 10.

While it is not clearly apparent from the drawing, feed press 4 preferably is a cylinder in which screw shaft 7 is mounted with very little play, namely only with sufficient play for rotation of screw shaft 7. This avoids uncontrolled leakage. On the other hand, the cylinder of feed press 4 has, in the illustrated embodiment and in accordance with the preferred embodiment of the invention, longitudinal grooves 11 which extend, in the illustrated example, at an angle of about 0° to the screw axis. In order to make this visible, screw shaft 7 is illustrated partly broken away in FIG. 1. The volume of grooves 11 is so dimensioned that it is about 5 to 10 percent of the screw thread volume related to the length of a single turn of the thread of screw 7. Here also, self-cleaning is ensured.

The size of receiving chambers 10 depends a little on the material to be processed. In the illustrated embodiment, every second planetary spindle 3 is reduced in axial length by an amount corresponding to its spindle diameter $d$, but excellent results can also be attained with a length reduction of $d/2$. This is particularly true when a plasticization and mastication of the material has already been attained in the feed press 4, which can be enhanced by heating the cylinder of feed press 4, as indicated in FIG. 1. This heating also permits control of the amount and uniformity of the feed.

While a specific embodiment of the invention has been shown and described in detail to illustrate the application of the principles of the invention, it will be understood that the invention may be embodied otherwise without departing from such principles.

What is claimed is:

1. In a machine for the preparation and extrusion of plastics, of the type including a planetary extruder with a cylinder, a central shaft, and planetary spindles rotatable about respective axes, the spindles being helically geared to the central shaft and to the cylinder for revolution of the planetary spindles around the central shaft, and a single-screw feeding device in advance of the extruder and aligned therewith, with the feeding device including a cylinder and a feed hopper, and a common shaft extending through the feeding device cylinder and the extruder, the common shaft, in the range of the feeding device, being designed as a screw shaft and, in the range of the planetary extruder, as the central shaft thereof: the improvement comprising, in combination, the single thread of said screw shaft having a clearance, with the cylinder of said feeding device, sufficient only to provide for rotation of said screw shaft, and extending from said feed hopper to said planetary extruder whereby, during rotation of said common shaft, material supplied through said feed hopper is plasticized in said feeding device and pressed toward said planetary extruder; at least one planetary spindle being axially shorter than the other planetary spindles to form a revolving receiving chamber, at its end adjacent said feeding device, for the material supplied by said feeding device acting as a feed press.

2. In a machine for the preparation and extrusion of plastics, the improvement claimed in claim 1, in which said cylinder of said feed press is formed with grooves extending longitudinally of its inner surface at an angle of 0° to the axis of the screw shaft of said feed press.

3. In a machine for the preparation and extrusion of plastics, the improvement claimed in claim 2, in which said longitudinally extending grooves define a material flow volume which is from 5 to 10 percent of the material flow volume defined by the cylinder of said feed press and a single turn of the thread of the screw shaft of said feed press.

4. In a machine for the preparation and extrusion of plastics, the improvement claimed in claim 1, including a single-screw extrusion press following said planetary extruder and aligned therewith; said common shaft also extending through said single-screw extrusion press and, in the range of said extrusion press, being designed as a screw shaft.

5. In a machine for the preparation and extrusion of plastics, the improvement claimed in claim 4, in which said single-screw extrusion press comprises a cylinder having said common shaft extending therethrough; the cylinder of said feeding device and said screw shaft extending therethrough defining a material processing and feeding volume greater than the receiving volume defined by the cylinder, central shaft and planetary spindles of said planetary extruder and the volume defined by the cylinder and the screw shaft of said extrusion press; whereby, during rotation of said common shaft, the rate of supply of material from said feeding device to said planetary extruder is in excess of the rate of extrusion of the material by said planetary extruder and the rate of feeding of the material by said extrusion press so that said planetary extruder, during rotation of said common shaft, is continuously supplied with plasticized material under pressure.

6. In a machine for the preparation and extrusion of plastics, the improvement claimed in claim 5, in which the screw shaft of said feed press has a length which is at least 2D where D is the overall exterior diameter of the screw shaft of the feed press.

7. In a machine for the preparation and extrusion of plastics, the improvement claimed in claim 6, in which the screw shaft of said feed press has a length which is 3D.

8. A machine for the preparation and extrusion of plastics, the improvement claimed in claim 5, in which the thread of the screw shaft of said feed press has a substantially rectangular cross section, and the screw shaft of said feed press has a tapering core.

9. In a machine for the preparation and extrusion of plastics, the improvement claimed in claim 1, in which, considered, circumferentially of the central shaft of said planetary extruder, alternate planetary spindles are axially foreshortened at their ends adjacent said feed press to form respective receiving chambers for the material supplied by said feed press.

10. In a machine for the preparation and extrusion of plastics, the improvement claimed in claim 9, in which said planetary spindles have cores with helical gear threads extending radially from the cores; the alternate planetary spindles being foreshortened, relative to the other planetary spindles therebetween, by an amount corresponding to the spindle core diameter in the range of $d/2$ to $d$, where $d$ is the spindle core diameter.

* * * * *